United States Patent [19]
Murphy

[11] Patent Number: 5,363,111
[45] Date of Patent: Nov. 8, 1994

[54] APPARATUS AND METHOD FOR SPATIAL NULLING OF INTERFERING SIGNALS

[75] Inventor: John W. Murphy, Cedar Rapids, Iowa

[73] Assignee: Rockwell International Corporation, Seal Beach, Calif.

[21] Appl. No.: 56,690

[22] Filed: Apr. 30, 1993

[51] Int. Cl.⁵ ............................ G01S 3/16; G01S 3/28
[52] U.S. Cl. ..................................... 342/383; 342/380
[58] Field of Search ............................... 342/380, 383

[56] References Cited

U.S. PATENT DOCUMENTS

| | | | |
|---|---|---|---|
| 4,442,433 | 4/1984 | Myers et al. | 342/378 |
| 4,628,321 | 12/1986 | Martin | 342/379 |
| 4,697,188 | 9/1987 | Lin | 342/383 |
| 4,734,701 | 3/1988 | Grobert | 342/380 |

Primary Examiner—Theodore M. Blum
Attorney, Agent, or Firm—Kyle Eppele; M. Lee Murrah; H. Fredrick Hamann

[57] ABSTRACT

An apparatus and method of using spatial nulling in antenna electronics to protect against interference signals. Nulling is achieved by computing and adjusting the computed complex weights values of "n" channels through the use of dithering of interfering signals of having power levels thereby allowing nulling of "n" minus one number of interfering signal. sources.

3 Claims, 3 Drawing Sheets

APPARATUS AND METHOD FOR SPATIAL NULLING OF INTERFERING SIGNALS

BACKGROUND OF THE INVENTION

This invention relates to wideband communications and more particularly to minimizing the effects of interference in a radio receiver system utilizing an adaptive antenna array.

Any communication system is susceptible to degradation due to interfering conditions. In a wideband transmission system the carrier signal is vulnerable to interruption by natural phenomena, interference from other signals or countermeasures. Countermeasures may take the form of a variety of jamming schemes whose sole purpose is to disrupt the operation of a receiver.

A variety of techniques are currently used to decrease the effects of interference in receivers. Frequency agility, sensitivity time control, sidelobe blanking, random PRF and sidelobe cancellation are but a few of the well known techniques for countering interfering signals. Jammer signals are often non-pulsed or continuous wave and may be sinusoidal, modulated or noise like in nature.

Adaptive nulling is an often used technique for rejecting interference. Adaptive nulling rejects interference by reducing the directional sensitivity of the receiver antenna in the direction of the interfering signal. Unfortunately, current technical implementations are ineffective in countering instances when the interfering signal is at a power level near or below the noise level.

Thus, there currently exists a need for low cost interference suppression in a variety of wideband environments.

SUMMARY OF THE INVENTION

The present invention is an apparatus and method of using spatial nulling in antenna electronics to protect against unwanted interference signals. Nulling is achieved by adjusting the computed complex weights of "n" channels based on minimizing output power. Since the desired signal power level is lower than the noise power level in a predetermined bandwidth, nulls will be formed only on interfering signals. By incrementally controlling the dithering value such that the dithered signal power level is greater than the measured noise level, interfering signals of low power level may be effectively nulled.

One embodiment of the present invention is implemented for a Global Positioning Satellite (GPS) receiver, such as manufactured by the assignee of the subject application. A four channel system, providing nulling of up to three interfering signals is specifically described herein, although the teachings of the present invention are easily portable to other hardware configurations.

It is therefore an object of the present invention to provide an apparatus and method for optimizing reception in wideband receiver systems.

It is a feature of the present invention to utilize a dithering process of the complex weight values in order to null the interfering signals.

It is another feature of the present invention to utilize spatial nulling of undesired signals.

It is an advantage of the present invention to provide a processing gain improvement of several decibels over currently known techniques.

These and other objects, features and advantages are disclosed and claimed in the specification, figures and claims of the present application.

DETAILED DESCRIPTION OF THE DRAWINGS

Figure 1:
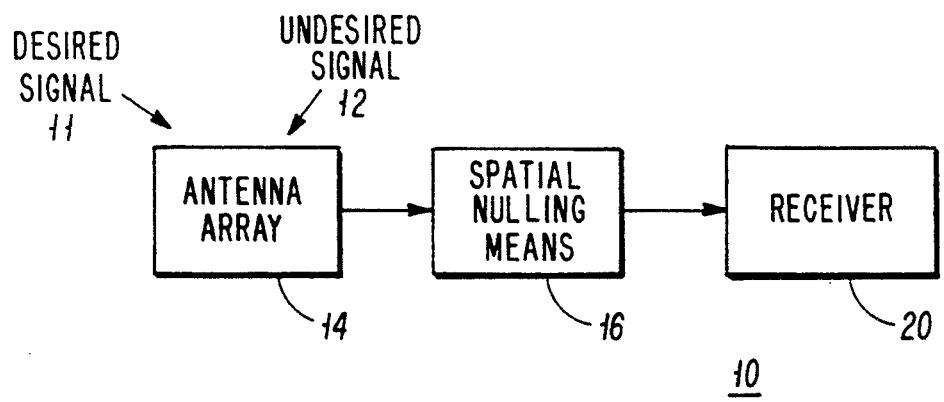
FIG. 1 is a block diagram of a wideband receiver system that incorporates the teachings of the present invention.

Referring now to the drawings wherein like items are referenced as such throughout, FIG. 1 illustrates a block diagram of certain portions of a GPS receiver system 10 (such as available from the Assignee) in which the teachings of the present invention may be incorporated. It should be noted that a GPS receiver is used for illustration purposes only and does not imply a limitation for the teachings of the present invention.

A variety of signals, depicted for illustration purposes as a desired signal 11 and an undesired signal 12, are received by an antenna array 14. GPS signals, the desired signal 11 in this instance, are centered at one of two frequencies, 1575.42 megahertz (MHz) and 1227.60 MHz, referred to as "L1" and "L2", respectively, and may be referred to as such throughout this document. The signals 11 and 12 detected by the antenna array 14 are then coupled to a spatial nulling means 16. The spatial nulling means 16 is then coupled to a receiver 20.

Figure 2:
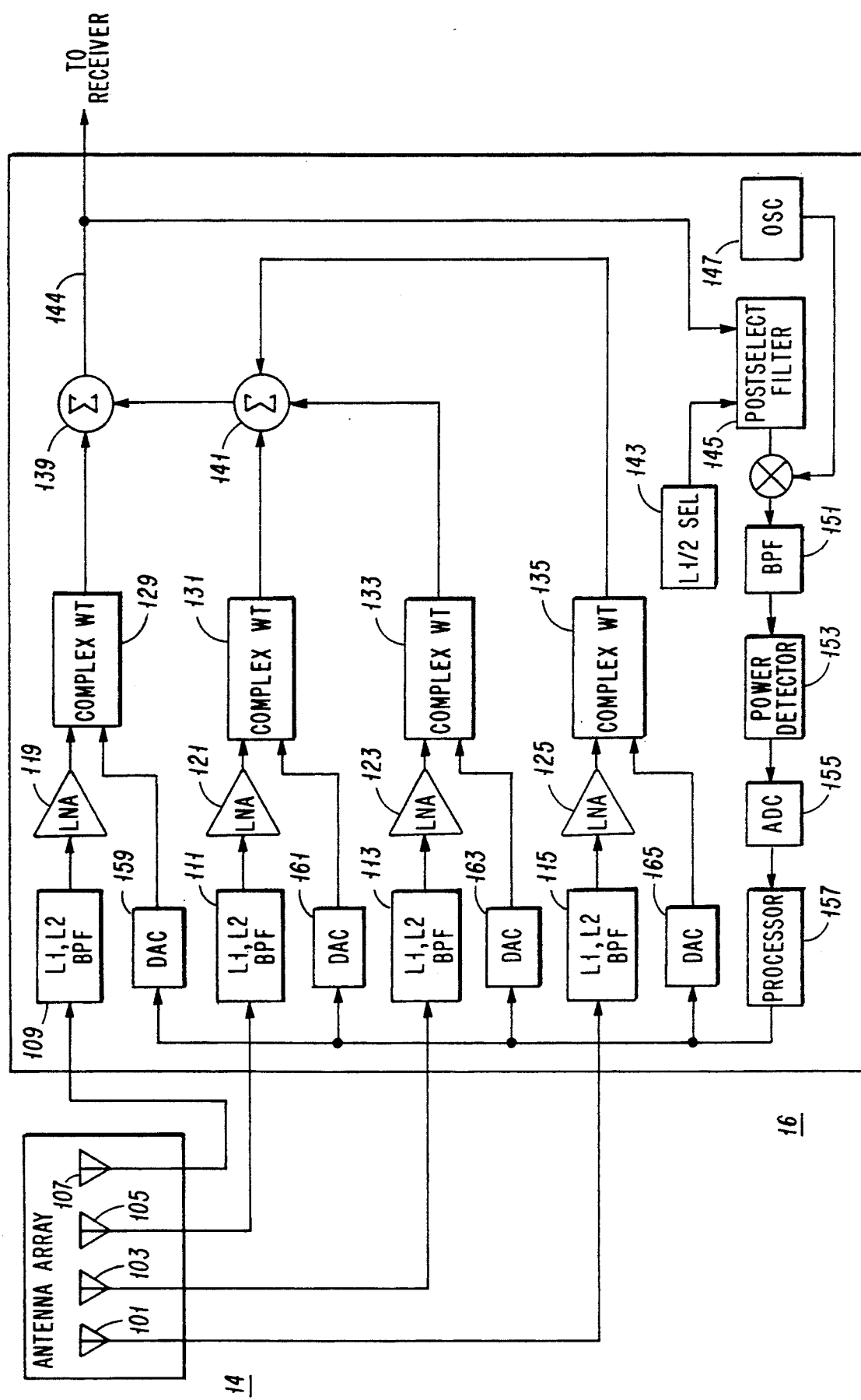
FIG. 2 is a block diagram of a portion of a GPS receiver incorporating the teachings of the present invention.

FIG. 2 illustrates a more detailed depiction of the antenna array 14 and the spatial nulling means 16 of FIG. 1. The antenna array 14 is comprised of four antenna elements 101, 103, 105 and 107 that each detect a downlink signal from a constellation of GPS spacecraft (not shown). Although depicted as a four channel device, it is understood that any number of desired channels may be utilized. For the sake of simplicity only one channel is described in detail, the elements and connections of additional channels being substantially similar and easily understood from the provided drawings and specification. Signals that are detected by antenna element 107 are routed through a preselect filter 109, a low noise amplifier 119 and a complex weight function means 129. (Similar processing is provided for the other three channels beginning with antenna elements means 101, 103 and 105). The outputs of all complex weight function means 129, 131, 133 and 135 are summed via summing means 139 and 141 thereby forming an output signal 144.

Figure 4:
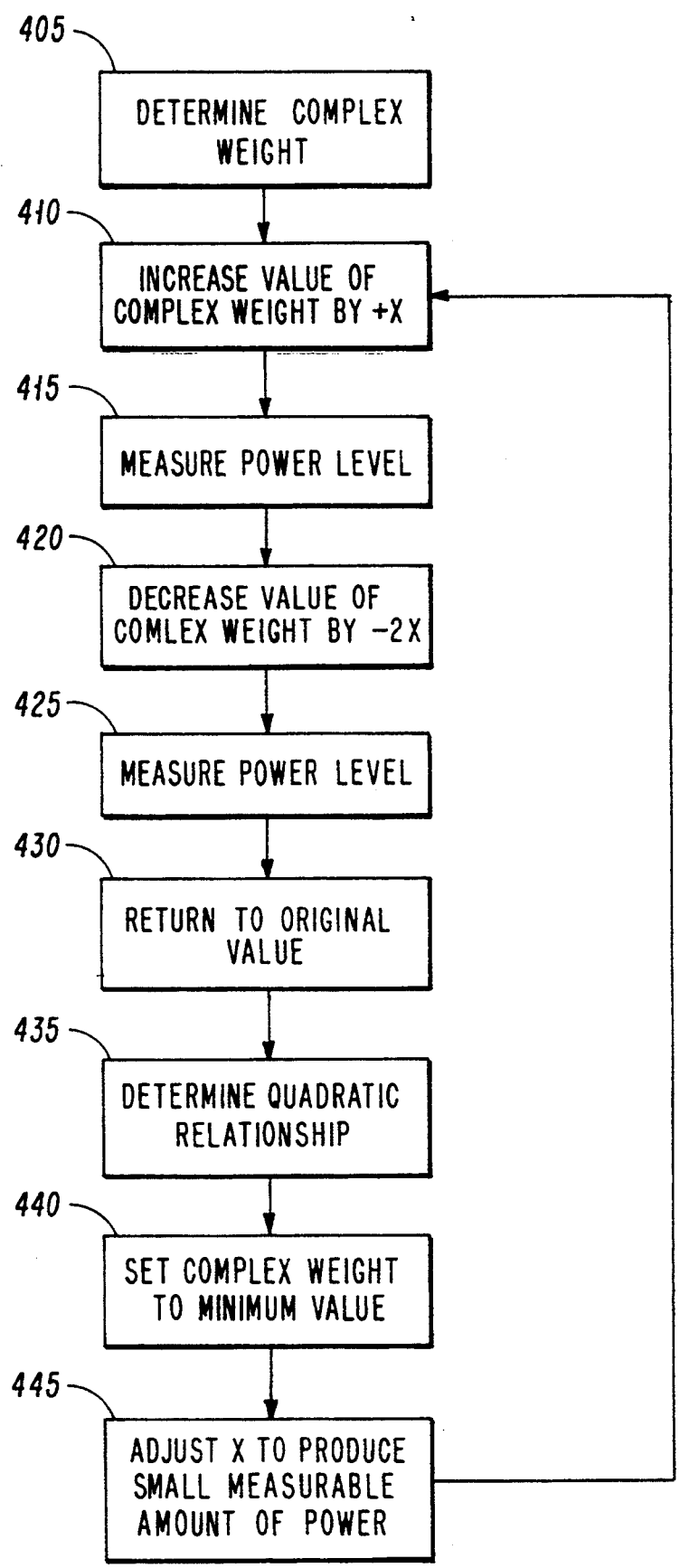
FIG. 4 is a flow chart of one embodiment of the complex weight perturbation of the present invention.

The signal 144 is translated to a lower frequency via selector means 143 and post select filter 145, passed through a bandpass filter 151 and a power detector 153 where the power level of the signal is measured. The output of the power detector 153 is coupled to an analog-to-digital converter 155 and in turn to a processor 157. The processor 157 is in turn coupled to a plurality of digital-to-analog converters 159, 161, 163 and 165 and in turn to complex weight function means 129, 131, 133 and 135. An algorithm (one embodiment of which is described in detail in FIG. 4 herewith) performed by the processor 157 controls the complex weight values so as to minimize the measured power, subject to the condition that at least one complex weight value has high gain. It should be noted that the processor 157 may be any readily available commercial micro-processor device. By assuming the undesirable signal is more powerful than the desired signal minimization of the measured power, it is possible to form a null in the direction of one or more interfering signals.

Figure 3:
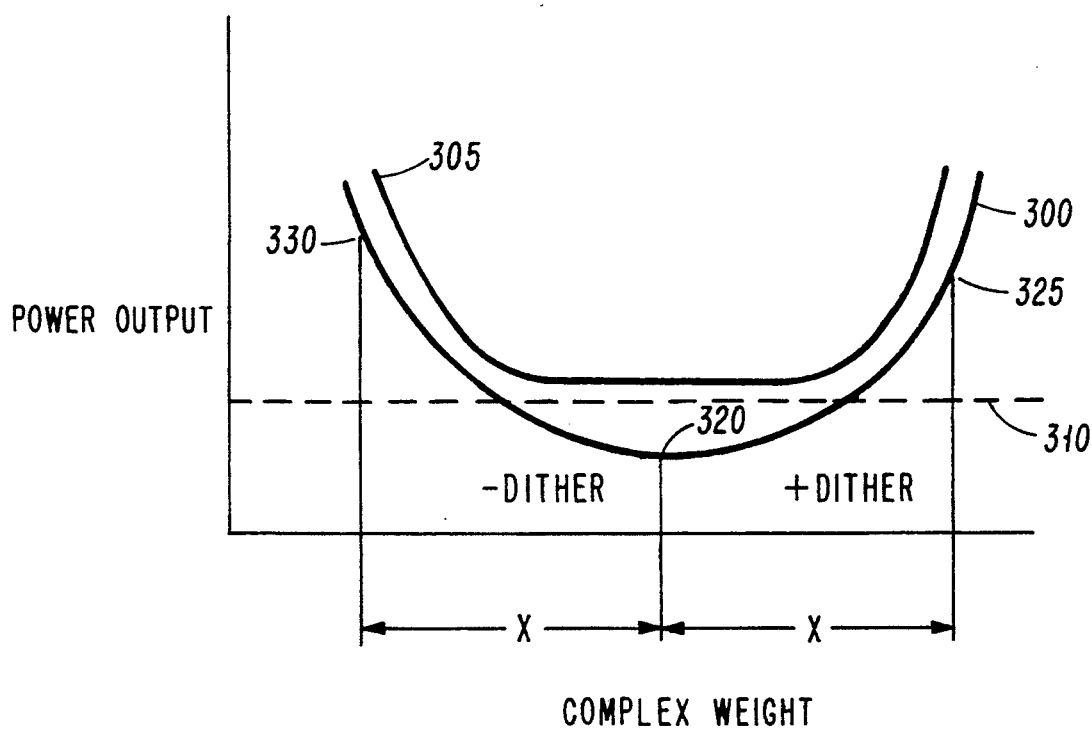
FIG. 3 is a two dimensional graph of a power output versus the complex weight value.

FIG. 3 depicts a graphical representation showing the effects of dithering of a processed signal power measurement. A first curve 300 represents a plot of a power level of a received signal that is undithered and has its minimum value less than the background noise level, represented by dashed line 310. When the residual interfering signal power level becomes less than the noise power at the output of the bandpass filter (109, 111, 113 and 115 of FIG. 2) prior art nulling techniques are unable to sense changes in the null depth. The null would not be improved and thus the null depth is limited. A second curve 305 represents the sum of curve 300 and line 310. The signal is dithered by an amount plus and minus X while the corresponding power level is measured, points 325 and 330, respectively.

The present invention teaches the use of dithering one or more complex weights by an amount sufficient to cause the power of the interfering signal to increase above the noise level. One complex weight value is increased by an amount X, then decreased by X, then returned to its undithered state. The power level is measured for each of the dithered conditions represented as finite points 325 and 330. A quadratic relationship is assumed to exist and the minimum point 320 may be determined. The value of the complex weight which corresponds to the minimum power is used and the process repeated for other complex weights.

By performing the dithering procedure as described herein a minimum of time is spent with the complex weight offset from its central value 320. Thus the power level of the interfering signal can be held below the noise level 310 for a significant period of time.

The process of determining the value of each complex weight as described above is depicted in the flowchart of FIG. 4. An initial step 405 comprises determining the original complex weight value of the received signal. The original measurement provides information in determining the value of X, chosen large enough so that the subsequent dithered measured value will be above the noise level. Next, the value of the complex weight is increased by a value X step 410. The power level is then measured again step 415. Now the value of the complex weight is decreased an amount equal to twice the value of X (net change in the original value is minus X), step 420 and the power level again measured, step 425 and the complex weight value returned to its original value, step 430. (Alternatively, the dithered value of step 415 could be returned to its original undithered value and a subsequent step comprised of subtracting an amount equal to minus X performed.) A quadratic relationship is then determined, step 435, for the respective measurements taken in steps 415 and 425 and a minimum value determined. The value of the complex weight is then set to the minimum value, step 440. Finally, the value of X is incrementally adjusted downward, a small but measurable amount, step 445 and the process repeated.

It is thought that the methods of the present invention and many of its attendant advantages will be understood from the foregoing description, and it will be apparent that various changes may be made in the form, construction and arrangement of the parts and the steps thereof without departing from the spirit and scope of the invention, or sacrificing all their material advantages, the forms described herein being merely preferred embodiments thereof.

I claim:

1. A method of performing nulling of interfering signals in a wideband transmission system having a known noise power level comprising the following steps:

measuring a power level of a received signal and determining a complex weight value;

determining a value for a dithering variable large enough to provide plus and minus dither points above the noise level;

increasing the value of the complex weight by an amount equal to the dithering variable;

measuring the power level of the plus dithered signal;

decreasing the value of the complex weight by an amount equal to twice the dithering variable;

measuring the power level of the minus dithered signal;

returning the signal to its undithered state;

determining a minimum point of the power level of an interfering signal by use of a quadratic relationship between the plus dithered signal level and the minus dithered signal power level;

setting the complex weight value to the determined minimum;

adjusting the value of the dithering variable a finite decremental amount; and repeating the steps.

2. The method of claim 1 wherein the system is multichannel and comprises a plurality of complex weight values, one of which is identified as a reference channel.

3. The method of claim 2 where the channel designated as the reference channel may vary among all channels.

* * * * *